Patented June 30, 1931

1,812,527

UNITED STATES PATENT OFFICE

OTTO GROSS AND FRIEDRICH JOST, OF SODINGEN, GERMANY, ASSIGNORS, BY MESNE ASSIGNMENTS, TO FIRM PATENTVERWERTUNGS A. G. "ALPINA," S. A. POUR L'EXPLOITATION DE BREVETS "ALPINA," PATENTS EXPLOITATION CY. "ALPINA," LTD., OF BASEL, SWITZERLAND

PROCESS OF PURIFYING HYDROGEN

No Drawing. Application filed August 26, 1927, Serial No. 215,758, and in Germany August 30, 1926.

This invention relates to processes of purifying hydrogen and it comprises a process in which hydrogen containing impurities of an organic nature such as carbon oxysulphides, mercaptans, and alkylsulphides is passed over a catalyst to convert the impurities into hydrogen sulphide or saturated hydrocarbons and thereafter the conversion products, or some of them, are removed.

Hydrogen used in catalytic syntheses, for instance, in the synthesis of ammonia, must be pure or substantially so. The catalysts used in such syntheses are easily poisoned, that is, their activity is greatly affected by the presence of various impurities in the hydrogen. Among such impurities, which tend to poison the catalyst, are compounds containing oxygen, sulphur, phosphorus and arsenic. On the other hand, compounds containing only carbon and hydrogen, more especially saturated hydrocarbons, are generally non-poisonous to the catalyst.

The general problem of freeing hydrogen from traces of impurities has received no little attention. In accordance with present day practice, it is customary to remove carbon dioxide, hydrogen sulphide, and other gaseous inorganic impurities of an acid nature by treating the impure hydrogen with an alkali. Any carbon monoxide in the gas is removed by solutions of copper salt.

It is very difficult to remove the last traces of such impurities but when they are of an acid nature, such as carbon dioxide or hydrogen sulphide, alkalies are generally effective.

Organic compounds containing sulphur, phosphorus, arsenic and the like however, are not taken up by an alkaline solution and therefore the process suitable for removing carbon dioxide is unavailable. Among such substances may be mentioned carbon disulphide, usually referred to as an inorganic compound, carbon oxysulphide, COS, mercaptans, $(CH_3)SH$, and alkylsulphides, $(CH_3)_2S$.

It has been suggested to remove such compounds by first converting them into inorganic sulphides by passing the impure hydrogen containing them over metals at elevated temperatures and thereafter absorbing the conversion products in an alkali. In the case of carbon disulphide, for instance, while hydrogen sulphide was formed, nevertheless the metal catalyst became contaminated by deposited carbon. Furthermore, the process was ineffective where but slight traces of impurities were present, say in quantities around 0.01%.

According to the process which we have invented, it is possible to obtain a complete conversion of the impurities of the type stated above and thus wholly free the hydrogen from such contaminating organic compounds. In our process, we conduct the impure hydrogen gas under high pressure, for instance, up to 100 atmospheres and at elevated temperatures, say between 200 and 500° C., over catalysts containing the heavy metals having an atomic weight between 51 and 65 inclusive, with the exception of copper. Oxides of these metals may be used instead of the metals themselves and in either case, it is advantageous to deposit the catalyst upon a support. Such metals as fall within the scope of our invention are iron, cobalt, nickel, zinc, chromium, manganese, or vanadium.

We find that the reactivity of these metals as a catalyst may be promoted by mixing the catalysts with oxides of the so-called light metals, that is, the metals of the alkali, alkaline earth, or earth metal groups, these being classified in groups 1, 2 and 3 of the periodic system.

We find that the metals of the iron group, and especially nickel, are most advantageous for our purpose. And as a promoter, we find that aluminum oxide exerts the most favorable action.

By using a catalyst chosen from the above group of heavy metals, and in conjunction with a promoter, such as for instance iron associated with aluminum oxide, we find that there is a considerable increase in the reactivity of the hydrogen with the impurities in question so that the hydrogen not only unites with the sulphur, for instance, of carbon bisulphide, but also unites with the carbon thereof to form methane. By using catalysts chosen in accordance with the above, we avoid any deposition of carbon and thus increase tremendously the effective life of the catalyst.

The methane formed as a result of the catalytic reaction between the hydrogen and the organic impurities, goes off with the hydrogen and, as stated, methane does not deleteriously affect the catalysts used in the subsequent catalytic synthesis employing the purified hydrogen.

In the same fashion, other organic compounds of sulphur, phosphorus, and arsenic, such as those above mentioned, are converted into hydrogen sulphide or other inorganic compounds of hydrogen together with methane or other saturated hydrocarbons.

The inorganic hydrogen compounds, such as hydrogen sulphide, phosphorine, or arsine, are easily absorbed in alkalies and we carry out this absorption after the conversion of the impurities into easily absorbed inorganic compounds.

Advantageously however, we mix oxides or hydroxides of the alkali metals, alkaline earth metals, or earth metals with the catalyst so that the conversion products, removable by alkalies, are taken up at once in the same mass by which the impurities are converted into substances readily reactive with alkalies. We find furthermore that the presence of an alkali metal oxide or hydroxide, for instance, promotes the activity of the catalyst.

The catalysts can be easily prepared by decomposing and reducing the nitrates or oxides of the above enumerated heavy metals although it is best to avoid high temperatures in preparing the catalysts in order to lessen any sintering effect.

Various changes may be made in the details disclosed in the foregoing specification without departing from our invention or sacrificing the advantages thereof.

We claim:

1. In the process of freeing hydrogen from gaseous organic impurities not absorbed by alkalies, the step which comprises passing the hydrogen at elevated temperature and a pressure up to about 100 atms. over a catalyst containing a heavy metal having an atomic weight of 51 to 65, other than copper, associated with an alkaline compound of a light metal to decompose the organic impurities into inorganic hydrogen compounds easily absorbed by alkalies.

2. In the process of freeing hydrogen from gaseous organic impurities not absorbed by alkalies, the step which comprises passing the hydrogen at elevated temperature and a pressure up to about 100 atms. over a catalyst comprising a metal of the iron group associated with an alkaline compound of a light metal, to decompose the organic impurities into inorganic hydrogen compounds easily absorbed by alkalies.

3. In the process of freeing hydrogen from gaseous organic impurities not absorbed by alkalies, the step which comprises passing the hydrogen at elevated temperature and a pressure up to about 100 atms. over a catalyst containing nickel associated with an alkaline compound of a light metal to decompose the organic impurities into inorganic hydrogen compounds easily absorbed by alkalies.

4. The process as in claim 1 in which the alkaline compound of a light metal is an oxide thereof.

5. The process as in claim 2 in which the alkaline compound of a light metal is an oxide thereof.

6. The process as in claim 3 in which the alkaline compound of a light metal is an oxide thereof.

7. The process as in claim 1 in which the alkaline compound is an oxide of aluminum.

8. The process as in claim 2 in which the alkaline compound is an oxide of aluminum.

9. The process as in claim 3 in which the alkaline compound is an oxide of aluminum.

In testimony whereof we affix our signatures.

OTTO GROSS.
FRIEDRICH JOST.